United States Patent
Dreher et al.

(10) Patent No.: US 6,716,922 B1
(45) Date of Patent: Apr. 6, 2004

(54) THERMALLY HARDENABLE POLYMER BINDING AGENT IN THE FORM OF A POWDER

(75) Inventors: Stefan Dreher, Neustadt (DE); Bernd Reck, Gruenstadt (DE); Michael Seufert, Bad Duerkheim (DE); Johannes Türk, Bohl-Iggelheim (DE); Matthias Laubender, Schifferstadt (DE); Matthias Gerst, Neustadt (DE); Heinrich Sack, Hassloch (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 18 days.

(21) Appl. No.: 10/110,716

(22) PCT Filed: Oct. 13, 2000

(86) PCT No.: PCT/EP00/10107

§ 371 (c)(1),
(2), (4) Date: Apr. 15, 2002

(87) PCT Pub. No.: WO01/27198

PCT Pub. Date: Apr. 19, 2001

(30) Foreign Application Priority Data

Oct. 14, 1999 (DE) .......................... 199 49 593

(51) Int. Cl.[7] .............. C08F 8/00; C08L 23/00; C08L 23/04; C08L 25/02; C08L 33/02
(52) U.S. Cl. ............. 525/191; 525/221; 525/222; 525/231; 525/240; 525/241
(58) Field of Search ............. 525/191, 221, 525/222, 231, 240, 241

(56) References Cited

U.S. PATENT DOCUMENTS

| | | |
|---|---|---|
| 3,409,578 A | 11/1968 | Hwa |
| 3,784,396 A | 1/1974 | Fourment et al. |
| 4,459,129 A * | 7/1984 | Gooding et al. ............. 8/115.6 |
| 4,612,224 A | 9/1986 | Davis |
| 5,658,993 A | 8/1997 | Denzinger et al. |
| 5,668,216 A | 9/1997 | Kinkel et al. |
| 5,959,029 A | 9/1999 | Koelliker et al. |
| 6,063,865 A | 5/2000 | Ball et al. |
| 6,228,937 B1 | 5/2001 | Eck et al. |
| 6,348,530 B1 | 2/2002 | Reck et al. |

FOREIGN PATENT DOCUMENTS

| | | |
|---|---|---|
| AU | 36659/89 | 4/1990 |
| DE | 2 214 450 | 10/1972 |
| DE | 27 01 490 | 7/1977 |
| DE | 43 06 808 | 9/1994 |
| DE | 197 29 161 | 1/1999 |
| EP | 0 601 518 | 6/1994 |
| EP | 0 721 004 | 7/1996 |
| EP | 0 723 975 | 7/1996 |
| EP | 0 725 093 | 8/1996 |
| EP | 0 894 821 | 2/1999 |
| EP | 0 894 822 | 2/1999 |
| GB | 1 523 084 | 8/1978 |
| JP | 55 108407 | 8/1980 |
| WO | WO 90/14457 | 11/1990 |

OTHER PUBLICATIONS

Derwent Abstracts, AN 1980–70361C, XP–002158222, JP 55–108407, Aug. 20, 1980.

* cited by examiner

Primary Examiner—Nathan M. Nutter
(74) Attorney, Agent, or Firm—Oblon, Spivak, McClelland, Maier & Neustadt, P.C.

(57) ABSTRACT

The invention relates to a thermally hardenable polymer dispersion powder and the use of said powder as a binding agent in particular for fibrous and grainy materials. The binding agent in powder form is obtained by drying a polymer dispersion which comprises a carboxyl-group-containing polymerization component in addition to, optionally, a hydroxy-alkylated amine.

30 Claims, No Drawings

THERMALLY HARDENABLE POLYMER BINDING AGENT IN THE FORM OF A POWDER

The present invention relates to heat-curable polymer dispersion powders and to their use as binders for moldings.

The consolidation of sheetlike fiber structures, examples being fiber webs, moldings such as fiberboard or chipboard panels, etc., is frequently done chemically using a polymeric binder. In this way, shaped parts of high mechanical strength, especially of high resistance to wetness and heat, are obtained. Besides liquid polymeric binders such as polymer solutions or polymer dispersions, use is also made of polymer powders. These powders lead to a lower energy requirement in the course of thermal curing, relative to the liquid binders, since there is no need to evaporate the, dispersion medium.

Heat-curable polymer powders and their use as binders are already known. DE 22 14 450 specifies powderous copolymers consisting of ethylene and maleic anhydride and, as crosslinkers, of compounds having 1 to 4 hydroxyl groups and at least one amine or amide group. The thermal crosslinking of such a composition takes place at from 110 to 300° C.

WO 90/14457 describes the use of thermoplastic polymer powders, e.g., polypropylene, polyesters or polyamide, as binders for glass fibers. AU 36659/89 recommends for this application polymer powders based on polyester or polystyrene. A disadvantage is the low strength of the fiber structures thus bound on contact with water or solvents.

The consolidation of powderous crosslinkable polymers based on phenol-formaldehyde resins is described in U.S. Pat. No. 4,612,224. A disadvantage with this binder system is the high level of formaldehyde emission during the preparation and use of the fiber materials thus consolidated.

Heat-curable copolymers based on acrylic esters and/or vinyl esters, further comprising (meth)acrylic esters of mono- and polyfunctional hydrbxycarboxylic acids and N-alkoxyalkyl(meth)acrylamide as crosslinker components are described in DE 27 01 490 as powderous coating compositions.

DE 43 06 808 specifies vinyl acetate copolymers or (meth)acrylate copolymers having a glass transition temperature of from −20 to +60° C. as powderous fiber binders. The copolymers contain from 0.1 to 10% by weight of N-methylol(meth)acrylamide as crosslinkable units, and crosslinking takes place at temperatures from 100 to 200° C. Owing to the presence of the hydroxymethylated monomer units, formaldehyde is given off in the course of thermal crosslinking.

EP 601 518 describes crosslinkable, water-dispersible dispersion powders based on carboxyl-containing acrylate copolymers which are dried in the presence of polyvinyl alcohol and may, for the purpose of crosslinking, contain polyvalent metal ions. Similar crosslinkable dispersion powders are known, too, from U.S. Pat. No. 3,409,578, in which polymer compositions comprising carboxyl-containing polymers and/or carboxyl-containing protective colloids are crosslinked in the presence of polyvalent metal ions. A disadvantage of these systems is that compositions of this kind frequently release acid in the presence of water and tend toward premature crosslinking, especially on contact with moisture. Moreover, the wet strength and dimensional stability of the resultant shaped parts under humid conditions is in many cases unsatisfactory.

EP 723 975 discloses crosslinkable dispersion powders based on copolymers containing epoxide groups. For the purpose of crosslinking, external crosslinkers, examples being polyamines, polycarboxylic acids, hydroxy-functionalized polymers, and also polyvalent metal salts, are added. A problem when using polyamines or polyvalent metal salts is the low stability on storage. The use of polycarboxylic acids or hydroxy-functionalized polymers does not impair the storage stability; however, for reaction with the epoxy groups, it is necessary to operate at an increased temperature, since otherwise the stabilization of the dispersion powders that is specified in the application using customary protective colloids would not be possible.

EP 721 004 discloses crosslinkable, redispersible powder mixtures which comprise film-forming polymer particles containing at least one functional, crosslinkable group. The crosslinkable group may also be introduced by way of the protective colloids. For crosslinking, this document, too, recommends the addition of an external crosslinker that comprises at least one reactive component which with the functional groups forms nonionic bonds after the mixture is redispersed in water.

EP 894 821 specifies polymer powders consisting of from 30 to 95% by weight of a water-insoluble polymer 1, from 5 to 70% by weight of a water-soluble polymer 2, and from 0.01 to 5% by weight of a phase transfer catalyst, the polymers 1 and/or 2 containing reactive groups which react with one another or with a crosslinker. Reactive groups specified include the following: alkoxysilane epoxy, isocyanate, hydroxyl, carboxyl, thiol, amino or aldehyde groups. Examples of the crosslinkers that are suitable include polyamines, polycarboxylic acids, and polyalcohols. Examples of suitable phase transfer catalysts are quaternary amines, phosphonium salts, and crown ethers. The compositions possess a high level of stability on storage and, after thermal curing, lead to shaped parts of high strength. Owing to the phase transfer catalyst present, the water absorption of the shaped parts is unsatisfactorily high and the resistance under humid conditions, accordingly, is low.

EP 894 822 describes polymer powders composed of from 30 to 95% by weight of a water-insoluble polymer 1 with from 0.5 to 10% by weight of reactive monomer, from 5 to 70% by weight of a water-soluble polymer 2, and a crosslinker which is present in salt form. Preferred reactive monomers are compounds containing carbonyl, epoxy, anhydride, isocyanate, and aziridine groups. Crosslinkers employed are hydrazides, hydrazines, hydrazones, amines, and hydroxylamine esters, examples being hexamethylenediamine phosphate and adipic dihydrazide acetate. The blocking of the crosslinkers in salt form ensures high storage stability of the compositions, with crosslinking ensuing only when a strong base is added or at elevated temperatures. The water resistance of the resultant fiber parts, and their resistance under humid conditions, however, are low.

DE-A-197 92 161 describes heat-curable aqueous compositions comprising at least one polymer (A1) containing in copolymerized form from 0 to 5% by weight of an α,β-ethylenically unsaturated mono- or dicarboxylic acid and being obtainable by free-radical polymerization in the presence of a) at least one polymer (A2) obtainable by free-radical polymerization and containing in copolymerized form from 15 to 100% by weight of an α,β-ethylenically unsaturated mono- or dicarboxylic acid, and b) at least one amine comprising at least one long chain having at least six carbon atoms, the weight ratio (based on solids) of polymer (A1) to polymer (A2) being in the range from 7:1 to 1:7 and the weight ratio of polymer (A2) to long-chain amine being in the range from 20:1 to 2:1. Powders based on this composition are not described.

It is an object of the present invention to provide powderous formaldehyde-free binders for bound substrates, such as moldings, for example. These binders should be suitable especially for fibrous and particulate substrates. Preferably, they should give the substrate high mechanical strength and dimensional stability even under humid conditions. The powderous binder should also have high stability on storage.

We have found that this object is achieved, surprisingly, by a heat-curable polymeric binder in powder form, comprising from 87.5 to 12.5% by weight, based on the overall weight of the polymeric binder, of at least one water-insoluble polymer A1, from 12.5 to 87.5% by weight, based on the overall weight of the polymeric binder, of at least one water-soluble polymer A2 composed of from 50 to 100% by weight, based on the polymer A2, of at least one ethylenically unsaturated mono- and/or dicarboxylic acid, from 0 to 50% by weight, based on the polymer A2, of at least one ethylenically unsaturated compound E selected from the esters of ethylenically unsaturated monocarboxylic acids and the monoesters and diesters of ethylenically unsaturated dicarboxylic acids with an amine containing at least one hydroxyl group, up to 20% by weight, based on the polymer A2, of one or more further monomers, and from 0 to 30% by weight, based on the overall weight of the polymeric binder, of at least one amine containing a hydroxyl group, said polymeric binder containing from 0.1 to 30% by weight of said amine containing at least one hydroxyl group, in the form of the compound E and/or as a separate component.

In connection with the monomer components of the polymer A1, alkyl is preferably straight-chain or branched $C_1-C_{22}$ alkyl radicals, especially $C_1-C_{12}$, and with particular preference $C_1-C_6$, alkyl radicals, such as methyl, ethyl, n-propyl, n-butyl, sec-butyl, tert-butyl, n-pentyl, n-hexyl, 2-ethylhexyl, n-dodecyl or n-stearyl.

Hydroxyalkyl is preferably hydroxy-$C_1-C_6$ alkyl, in which the alkyl radicals may be straight-chain or branched, and in particular is 2-hydroxyethyl, 2- or 3-hydroxypropyl, 2-methyl-2-hydroxypropyl, and 4-hydroxybutyl.

Cycloalkyl is preferably $C_5-C_7$ cyclohexyl, especially cyclopentyl and cyclohexyl.

Aryl is preferably phenyl or naphthyl.

The polymer A1 is generally a free-radical emulsion polymer. It may he prepared using all monomers that can be polymerized by free-radical polymerization. In general, the polymer is synthesized from from 80 to 100% by weight, preferably from 85 to 99.9% by weight, based on the overall weight of the monomers for the polymer A1, of at least one ethylenically unsaturated principal monomer, and from 0 to 20% by weight, preferably from 0.1 to 15% by weight, based on the overall weight of the monomers for the polymer A1, of at least one ethylenically unsaturated comonomer.

The principal monomer generally comprises a monoethylenically unsaturated monomer or conjugated diolefins whose solubility in water is limited, being in general less than 80 g/l, preferably less than 50 g/l, e.g., in the range from 0.1 to 50 g/l (based on 25° C. and 1 bar).

The principal monomer is preferably selected from esters of preferably $C_3-C_6$ α,β-monoethylenically unsaturated mono- or dicarboxylic acid, such as acrylic acid, methacrylic acid, maleic acid, fumaric acid, and itaconic acid, with $C_1-C_{12}$, preferably $C_1-C_8$ alkanols. Particular examples of such esters are methyl, ethyl, n-butyl, isobutyl, tert-butyl, n-pentyl, isopentyl, and 2-ethylhexyl acrylate and/or methacrylate;

vinylaromatic compounds, preferably styrene, α-methylstyrene, o-chlorostyrene, vinyltoluenes, and mixtures thereof;

vinyl esters of $C_1-C_{18}$ mono- or dicarboxylic acids, such as vinyl acetate, vinyl propionate, vinyl n-butyrate, vinyl laurate and/or vinyl stearate;

conjugated dienes, butadiene;

linear 1-olefins, branched-chain 1-olefins or cyclic olefins, such as ethene, propene, butene, isobutene, pentene, cyclopentene, hexene, and cyclohexene, for example. Also suitable are oligoolefins prepared using metallocene catalysis and having a terminal double bond, such as oligopropene or oligohexene, for example;

acrylonitrile, methacrylonitrile. Because of the nitrites' increased water solubility, their proportion among the principal monomers will normally not exceed 30% by weight of the overall monomer amount. Where desired the nitrites account for usually from 1 to 30%, preferably 2 to 25%, and particularly from 5 to 20% by weight of the overall monomer amount.

vinyl and allyl alkyl ethers having 1 to 40 carbon atoms in the alkyl radical, said alkyl radical possibly carrying further substituents such as one or more hydroxyl groups, one or more amino or diamino groups, or one or more alkoxylate groups, examples being methyl vinyl ether, ethyl vinyl ether, propyl vinyl ether and 2-ethylhexyl vinyl ether, isobutyl vinyl ether, vinyl cyclohexyl ether, vinyl 4-hydroxybutyl ether, decyl vinyl ether, dodecyl vinyl ether, octadecyl vinyl ether, 2-(diethylamino)ethyl vinyl ether, 2-(di-n-butylamino) ethyl vinyl ether, methyldiglycol vinyl ether, and the corresponding allyl ethers, and/or mixtures thereof.

Particularly preferred principal monomers are vinylaromatic monomers, especially styrene, and also esters of acrylic acid and esters of methacrylic acid with $C_1-C_8$ alkanols, especially methyl methacrylate, n-butyl acrylate, ethyl acrylate, 2-ethylhexyl acrylate, and vinyl acetate, ethene, and butadiene.

Examples of suitable comonomers are:

monoethylenically unsaturated $C_3-C_8$ mono- or dicarboxylic acids or their anhydrides, preferably acrylic acid, methacrylic acid, methacrylic anhydride, maleic acid, maleic anhydride, fumaric acid and/or itaconic acid;

amides and N-alkylamides of the aforementioned ethylenically unsaturated carboxylic acids, such as acrylamide, methacrylamide, N,N-dimethylacrylamide, N-tert-butylacrylamide, N-methylmethacrylamide, N-alkylolamides, especially N-hydroxymethyl- and N-hydroxyethylamides of manoethylenically unsaturated monocarboxylic acids such as N-methylolacrylamide and methacrylamide;

sulfo-functional monomers, such as allylsulfonic acid, methallylsulfonic acid, styrenesulfonic acid, vinylsulfonic acid, 2-acrylamido-2-methylpropanesulfonic acid, allyloxybenzenesulfonic acid, their corresponding alkali metal or ammonium salts, and mixtures thereof, and also sulfopropyl acrylate and/or sulfopropyl methacrylate, for example;

$C_1$–$C_4$ hydroxyalkyl esters of $C_3$–$C_8$ mono- or dicarboxylic acids, especially of acrylic acid, methacrylic acid or maleic acid, or their derivatives alkoxylated with from 2 to 50 mol of ethylene oxide, propylene oxide, butylene oxide or mixtures thereof, or esters of the abovementioned acids with $C_1$–$C_{18}$ alcohols alkoxylated with from 2 to 50 mol of ethylene oxide, propylene oxide, butylene oxide or mixtures thereof, such as hydroxyethyl acrylate, hydroxyethyl methacrylate, hydroxypropyl acrylate, hydroxypropyl methacrylate, 1,4-butanediol monoacrylate, ethyldiglycol acrylate, methylpolyglycol acrylate (11 EO), (meth)acrylic esters of $C_{13}/C_{15}$ oxo alcohol reacted with 3, 5, 7, 10 or 30 mol of ethylene oxide, and mixtures thereof;

ethylenically unsaturated phosphoric and phosphonic acids, e.g., vinylphosphonic acid and its salts, dimethyl vinylphosphonate, acryloxyethyl phosphate, acryloxyethyl phosphonate, 2-acrylamido-2-methylphosphonate and similar alkylaminoalkyl (meth)acrylates or alkylaminoalkyl (meth)acrylamides or quaternization products thereof, such as, for example, 2-(N,N-dimethylamino)ethyl (meth)acrylate, 2-(N,N,N-trimethylammonium)ethyl methacrylate chloride, 3-(N,N-dimethylamino)propyl (meth)acrylate, 2-dimethylaminoethyl(meth) acrylamide, 3-dimethylaminopropyl(meth)acrylamide, 3-trimethylammoniumpropyl(meth)acrylamide chloride and mixtures thereof;

allyl esters of $C_1$–$C_{30}$ monocarboxylic acids;

N-vinyl compounds, such as N-vinylformamide, N-vinyl-N-methylformamide, N-vinylpyrrolidone, N-vinylimidazole, 1-vinyl-2-methylimidazole, 1-vinyl-2-methylimidazoline, 2-vinylpyridine, 4-vinylpyridine, N-vinylcarbazole and/or N-vinylcaprolactam;

diallyldimethylammonium chloride, vinylidene chloride, vinyl chloride, acrolein, methacrolein;

monomers containing 1,3-diketo groups, such as acetoacetoxyethyl (meth)acrylate or diacetoneacrylamide, monomers containing urea groups, such as ureidoethyl (meth)acrylate, acrylamidoglycolic acid, and methyl methacrylamidoglycolate;

monomers containing silyl groups, such as trimethoxysilylpropyl methacrylate;

monomers containing glycidyl groups, such as glycidyl methacrylate.

Preferred comonomers are hydroxyethyl acrylate, hydroxypropyl acrylate, hydroxybutyl acrylate, hydroxyethyl methacrylate and mixtures thereof. Very particular preference is given to hydroxyethyl acrylate and hydroxyethyl methacrylate, especially in amounts of from 2 to 20% by weight, based on the overall monomer A1.

Further preferred comonomers are the aforementioned monoethylenically unsaturated carboxylic acids, particularly the monocarboxylic acids, which are incorporated by polymerization preferably in an amount of up to 10% by weight, e.g., from 0.1 to 10% by weight, in the polymer A1.

Further preferred comonomers are the amides of monoethylenically unsaturated monocarboxylic acids, e.g., acrylamide or methacrylamide. Where desired they generally account for up to 10% by weight, e.g., from 0.1 to 10% by weight, in particular from 0.1 to 5% by weight, of the overall monomer amount.

The monomer composition is generally chosen such that a glass transition temperature Tg in the range from −60° C. to +150° C. results for the polymer A1. The glass transition temperature Tg of the polymers may be determined conventionally by means, for example, of Differential Scanning Calorimetry (DSC). The Tg may also be calculated approximately by means of the Fox equation. According to Fox T. G., Bull. Am. Physics Soc. 1,3, page 123 (1956), the following is true: $1/Tg = x_1/Tg_1 + x_2/Tg_2 + \ldots + x_n/Tg_n$, where $x_n$ is the mass fraction (% by weight/100) of the monomer n and $Tg_n$ is the glass transition temperature, in kelvins, of the homopolymer of the monomer n. Tg values for the homopolymers are listed in Polymer Handbook 3rd Edition, J. Wiley & Sons, New York (1989). For further processing to fibrous insulating panels, it is preferred to use polymers A1 having a glass transition temperature in the range from 60 to 120° C. For further processing to cork products, the glass transition temperature is preferably in the range from −50 to 90° C.

The powderous polymeric binders of the invention comprise, in accordance with the invention, at least one amine containing at least one hydroxyl group, and do so in the form of the compound E incorporated by copolymerization in the polymer A2, and/or as a separate component.

The ethylenically unsaturated compound E used if desired as a component of the polymers A2 preferably comprises esters of the abovementioned $C_3$–$C_{10}$ monocarboxylic acids, especially of acrylic acid, methacrylic acid or crotonic acid, and the monoesters and/or the diesters of the abovementioned $C_4$–$C_8$ dicarboxylic acids, especially of fumaric acid, of maleic acid, of 2-methylmaleic acid and of itaconic acid, with the amine containing at least one hydroxyl group.

In accordance with the invention the powderous polymeric binder contains the amine containing at least one hydroxyl group in an amount of from 0.1 to 30% by weight, in particular from 0.5 to 20% by weight, based on the overall weight of the powderous binder, it being possible for the amine to be present in the form of the monomers E polymerized in the polymer A2 and/or in the form of a separate constituent.

The amine which contains hydroxyl groups and is incorporated by condensation in the compound E and/or is used separately comprises, in one preferred embodiment of the invention, a secondary or tertiary amine which has one or, in the case of the tertiary amines, one or two long-chain hydrocarbon radicals including at least 6 and preferably up to 30, in particular up to 22, carbon atoms and at least one hyrdoxyl-containing radical. The long-chain hydrocarbon radicals are, for example, $C_6$ to $C_{22}$ alkyl, $C_6$ to $C_{22}$ alkenyl, $C_6$ to $C_{22}$ alkylaryl and $C_6$ to $C_{22}$ alkenylaryl, with $C_6$ to $C_{22}$ alkenyl having one, two or three nonadjacent double bonds. The latter is selected preferably from $C_1$–$C_6$ hydroxyalkyl, especially $C_2$–$C_4$ hydroxyalkyl, and poly-$C_1$–$C_6$ alkylene oxide radicals with terminal hydroxyl groups. The polyalkylene oxide radicals generally have from 2 to 100, preferably from 2 to 50, alkylene oxide units, which are identical or different and in general derived from ethylene oxide, 1,2-propylene oxide and/or 1,2-butylene oxide, in particular from ethylene oxide. In the case of different alkylene oxide units in the polyalkylene oxide radicals, these units may be present in blocks with a uniform structure, or distributed at random.

Preferably, the amine containing at least one hydroxyl group and having a long-chain hydrocarbon radical is selected from amines of the formula (I)

where $R^c$ is $C_6$ to $C_{22}$ alkyl, $C_6$ to $C_{22}$ alkenyl, aryl-$C_6$–$C_{22}$ alkyl or aryl-$C_6$–$C_{22}$ alkenyl, it being possible for the alkenyl radical to have 1, 2 or 3 nonadjacent double bonds, $R^a$ is hydroxy-$C_1$–$C_6$ alkyl or a radical of the formula II

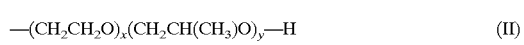

where
in the formula II the sequence of the alkylene oxide units is arbitrary and x and y independently of one another are integers from 0 to 100, preferably from 0 to 50, the sum of x and y being >1, $R^b$ is hydrogen, $C_1$ to $C_{22}$ alkyl, hydroxy-$C_1$–$C_6$ alkyl, $C_6$ to $C_{22}$ alkenyl, aryl-$C_6$–$C_{22}$ alkyl, aryl-$C_6$–$C_{22}$ alkenyl or $C_5$ to $C_8$ cycloalkyl, it being possible for the alkenyl radical to have 1, 2 or 3 nonadjacent double bonds, or $R^b$ is a radical of the formula III

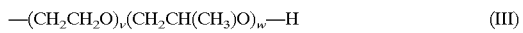

—(CH$_2$CH$_2$O)$_v$(CH$_2$CH(CH$_3$)O)$_w$—H    (III)

where
in the formula III the sequence of the alkylene oxide units is arbitrary and v and w independently of one another are integers from 0 to 100, preferably from 0 to 50, and mixtures thereof. These amines act as surface-active compounds.

Preferably $R^c$ is $C_8$ to $C_{20}$ alkyl or $C_8$ to $C_{20}$ alkenyl, it being possible for the alkenyl radical to have 1, 2 or 3 nonadjacent double bonds. $R^c$ is preferably the hydrocarbon radical of a saturated or mono- or polyunsaturated fatty acid. Preferred radicals $R^c$ are, for example, n-octyl, ethylhexyl, undecyl, lauryl, tridecyl, myristyl, pentadecyl, palmityl, margarinyl, stearyl, palmitoleinyl, oleyl and linolyl.

With particular preference, this amine component comprises an alkoxylated fatty amine or an alkoxylated fatty amine mixture. The ethoxylates are particularly preferred. Use is made in particular of alkoxylates of amines based on naturally occurring fatty acids, such as tallow fatty amines, for example, which contain predominantly saturated and unsaturated $C_{14}$, $C_{16}$ and $C_{18}$ alkylamines, or cocoamines, containing saturated, mono- and diunsaturated $C_6$–$C_{22}$, preferably $C_{12}$–$C_{14}$ alkylamines. Amine mixtures suitable for alkoxylation are, for example, various Armeen® grades from Akzo or Noram® grades from Ceca.

Examples of suitable commercially available alkoxylated amines having long-chain hydrocarbon radicals are the Noramox® grades from Ceca, preferably ethoxylated oleyl amines, such as Noramox® 05 (5 EO units), and the products from BASF AG marketed under the brand name Lutensol®FA.

The polymer A2 incorporates from 50 to 100% by weight, preferably from 60 to 100% by weight, with particular preference from 70 to 100% by weight, of at least one ethylenically unsaturated mono- or dicarboxylic acid. Within the polymer, these acids may also, if desired, be present fully or partly in the form of a salt. Preference is given to the acidic form. To prepare the polymers A2 it is of course also possible to use the anhydrides of the ethylenically unsaturated mono- or dicarboxylic acids, or mixtures of the anhydrides with the acids.

The solubility of the polymer A2 in water is preferably at least 10 g/l (at 25° C.), in particular at least 50 g/l. The weight-average molecular weight of the polymers A2 is preferably in the range from 500 to 500 000 and in particular in the range from 1 000 to 200 000. The K values of the polymers A2 are generally in the range from 8 to 150, preferably in the range from 10 to 100 (measured as a 2% strength by weight solution of the polymer A2 in water).

Ethylenically unsaturated carboxylic acids that may be used have already been specified above in connection with the polymer A1. Preferred carboxylic acids are $C_3$ to $C_{10}$ monocarboxylic acids and $C_4$ to $C_8$ dicarboxylic acids, especially acrylic acid, methacrylic acid, crotonic acid, fumaric acid, maleic acid, 2-methylmaleic acid and/or itaconic acid. Particular preference is given to acrylic acid, methacrylic acid, maleic acid and mixtures thereof. Suitable carboxylic anhydride components are anhydrides of the abovementioned carboxylic acids. Maleic anhydride and/or itaconic anhydride are particularly preferred.

In one preferred embodiment, the polymer A2 further comprises from 0.5 to 50% by weight, preferably from 1 to 30% by weight, based on the overall weight of the polymer A2, of structural elements derived from at least one ethylenically unsaturated compound E, the amine component of this compound preferably being alkoxylated and having at least one terminal hydroxyl group.

Particularly preferred amine components of the compound E are the above-described amines of the formula $R^c NR^a R^b$, $R^a$, $R^b$ and $R^c$ possessing the definitions indicated, especially the definitions specified as being preferred.

The preparation of the above-described esters, monoesters and diesters (ethylenically unsaturated compounds E) takes place in accordance with customary techniques known to the skilled worker. To prepare esters of unsaturated monocarboxylic acids, the free acids or suitable derivatives, such as anhydrides, halides, e.g., chlorides, and $C_1$ to $C_4$ alkyl esters may be used. The preparation of monoesters of unsaturated dicarboxylic acids takes place preferably starting from the corresponding dicarboxylic anhydrides. The reaction is preferably effected in the presence of a catalyst, such as a dialkyl titanate or an acid, such as sulfuric acid, toluenesulfonic acid, or methanesulfonic acid, for example. The reaction takes place generally at reaction temperatures from 60 to 200° C. In accordance with one appropriate embodiment, the reaction takes place in the presence of an inert gas, such as nitrogen. Water formed during the reaction may be removed from the reaction mixture by means of appropriate measures, such as distillation. The reaction may take place, if desired, in the presence of customary polymerization inhibitors. Essentially, the esterification reaction may be conducted to completion or just to a partial conversion. If desired, one of the ester components, preferably the hydroxyl-containing amine, may be used in excess. The extent of esterification may be determined by means of infrared spectroscopy.

In one preferred embodiment, the unsaturated esters, monoesters or diesters E are prepared and further reacted to the polymers A2 used in accordance with the invention without isolation of the esters, the two reactions preferably taking place in succession in the same reaction vessel.

To prepare the polymers A2 it is preferred to use a reaction product of a dicarboxylic anhydride, preferably maleic anhydride, and one of the above-described hydroxyl-containing amines as compound E.

In addition to at least one ethylenically unsaturated mono- and/or dicarboxylic acid and if appropriate at least one compound E, the polymer A2 may also contain in copolymerized form from 0 to 20% by weight, preferably from 0.1 to 10% by weight, of other monomers. Monomers which may be used are the monomers specified in connection with the polymer A1, particular preference being given to vinylaromatic compounds, such as styrene, olefins, examples being ethylene, or (meth)acrylic esters such as methyl (meth)acrylate, ethyl (meth)acrylate, n-butyl (meth)acrylate, 2-ethylhexyl (meth)acrylate, and mixtures thereof.

The polymers A2 are prepared preferably by free-radical polymerization in bulk or in solution. Examples of suitable solvents for the solvent polymerization are water, water-miscible organic solvents such as alcohols and ketones, examples being methanol, ethanol, n-propanol, isopropanol, n-butanol, acetone, methyl ethyl ketone, etc., and mixtures thereof. Examples of suitable polymerization initiators are peroxides, hydroperoxides, peroxodisulfates, percarbonates, peroxo esters, hydrogen peroxide and azo compounds, as described in more detail below for the preparation of the polymer dispersions of the invention. If desired, the polymers A2 may be prepared separately and isolated and/or purified by a conventional method. Preferably, the polymers A2 are prepared directly before the preparation of the binders of the invention and they are used without isolation.

The polymers A2 incorporating a compound E may advantageously also be prepared by means of polymer-analogous reaction. For this purpose, a polymer incorporating from 80 to 100% by weight of at least one ethylenically unsaturated mono- and/or dicarboxylic acid may be reacted with at least one hdyroxyl-containing amine.

Suitable ethylenically unsaturated mono- and dicarboxylic acids for preparing polymers, for polymer-analogous reactions, are those mentioned above as components of the compound E: $C_3$–$C_{10}$ mono- and $C_4$–$C_8$ dicarboxylic acids and their anhydrides. Suitable amines having at least one hydroxyl group are likewise those mentioned above. In the polymer for polymer-analogous reaction, the acids may, if desired, be present fully or partly in the form of a derivative, preferably a $C_1$ to $C_6$ alkyl ester.

Preparing the polymers A2 by means of polymer-analogous reaction is preferably done in an appropriate nonaqueous solvent or in bulk. In the case of the reaction in bulk, the amine component may if desired be used in excess, so as to act as solvent. Preferred solvents are those which form an azeotrope with water and so make it easy to remove the water formed during the reaction. The reaction preferably takes place in the presence of an esterification catalyst, as described above. The reaction temperature is preferably in a range from 100 to 200° C. Water formed during the reaction may be removed by means of appropriate measures, such as distillation, for example. Polymers A2 incorporating at least one compound E are preferably in the form of comb polymers with covalently bonded amine side chains.

The weight ratio of polymer A1 to polymer A2, based on solids, is generally in the range from 7:1 to 1:7, in particular from 3:1 to 1:3.

The weight ratio of hydroxyl-containing amine to polymer A2 is preferably in the range from 1:100 to 2:1, in particular in the range from 1:10 to 1:1.

In another preferred embodiment of the invention the powderous binder comprises as hydroxyl-containing amine an amine containing at least two hydroxyl groups which is different than the abovementioned amines having at least one long-chain hydrocarbon radical. These amines act as a crosslinking component. They include, in particular, amines of the formula IV

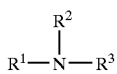

(IV)

where $R^1$ is a hydrogen atom, a $C_1$–$C_5$ alkyl group, a $C_2$–$C_{10}$ hydroxyalkyl group, or a radical of the formula V —(CH$_2$CH$_2$O)$_x$(CH$_2$CH(CH$_3$)O)$_y$—H (V)

where in the formula V the sequence of the alkylene oxide units is arbitrary and x and y independently of one another are integers from 0 to 100, the sum of x and y being>1, and $R^2$ and $R^3$ independently of one another are a $C_2$–$C_{10}$ hydroxyalkyl group.

With particular preference, $R^2$ and $R^3$ independently of one another are a $C_2$–$C_4$ hydroxyalkyl group, especially a 2-hydroxyethyl, a 2- or 3-hydroxypropyl or a 2-, 3- or 4-hydroxybutyl group, and $R^1$ is a hydrogen atom, a $C_1$–$C_4$ alkyl group, particularly methyl, ethyl, n- and iso-propyl, or a $C_2$–$C_4$ hydroxyalkyl group.

Particular preference is given to diethanolamine, triethanolamine, diisopropanolamine, triisopropanolamine, methyldiethanolamine, butyldiethanolamine and methyldiisopropanolamine, especially triethanolamine, and the alkoxylates thereof.

Further preferred hydroxyalkylamines are the amines disclosed as component A in DE 196 21 573, which is hereby incorporated by reference. These compounds comprise linear or branched aliphatic compounds containing per molecule at least two functional amino groups of type (a) and/or (b)

where R is $C_2$–$C_4$ hydroxyalkyl and R' is $C_1$–$C_5$ alkyl. The compound is preferably a compound of the formula VI

(VI)

where

A is $C2$–$C_{18}$ alkylene unsubstituted or substituted by one or more groups selected independently of one another from $C_1$–$C_4$ alkyl, $C_2$–$C_4$ hydroxyalkyl, $C_3$–$C_7$ cycloalkyl, OH and NR$^6$R$^7$, R$^6$ and R$^7$ independently of one another being H, $C_2$–$C_4$ hydroxyalkyl or $C_1$–$C_4$ alkyl, which is uninterrupted or interrupted by one or more oxygen atoms and/or NR$^5$ groups, R$^5$ being H, hydroxyalkyl, (CH$_2$)$_n$NR$^6$R$^7$, where n is from 2 to 5 and R$^6$ and R$^7$ are as defined above, or alkyl, which may in turn be interrupted by one or more NR$^5$ groups, R$^5$ possessing the abovementioned definitions, and/or substituted by one or more NR$^6$R$^7$ groups, R$^6$ and R$^7$ possessing the abovementioned definitions;

or A is a radical of the formula:

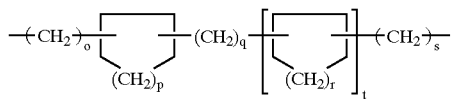

where o, q and s independently of one another are 0 or an integer from 1 to 6, p and r independently of one another are 1 or 2, and t is 0, 1 or 2, it also being possible for the cycloaliphatic radicals to be substituted by 1, 2 or 3 $C_1$–$C_4$ alkyl radicals, and $R^1$, $R^2$ and $R^3$ and $R^4$ independently of one another are H, $C_2$–$C_4$ hydroxyalkyl, $C_1$–$C_4$ alkyl or $C_3$–$C_7$ cycloalkyl.

Particular preference among the compounds of the formula VI is given to:

(1) Compounds of the Formula VIa

(VIa)

where

A₁ is $C_2$–$C_{12}$ alkylene unsubstituted or substituted by at least one $C_1$–$C_4$ alkyl group and/or at least one $NR^6R^7$ group, in which $R^6$ and $R^7$ independently of one another are $C_1$–$C_4$ alkyl or $C_2$–$C_4$ hydroxyalkyl, and $R^1$, $R^2$, $R^3$ and $R^4$ independently of one another are $C_2$–$C_4$ hydroxyalkyl or H or one of the radicals $R^1$ and $R^2$ and/or one of the radicals $R^3$ and $R^4$ is $C_1$–$C_4$ alkyl or $C_3$–$C_7$ cycloalkyl.

Particularly useful compounds of this type are the compounds of the following formulae:

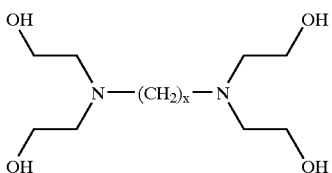

where x is from 2 to 12, especially 2, 3, 6, 8, 10 or 12,

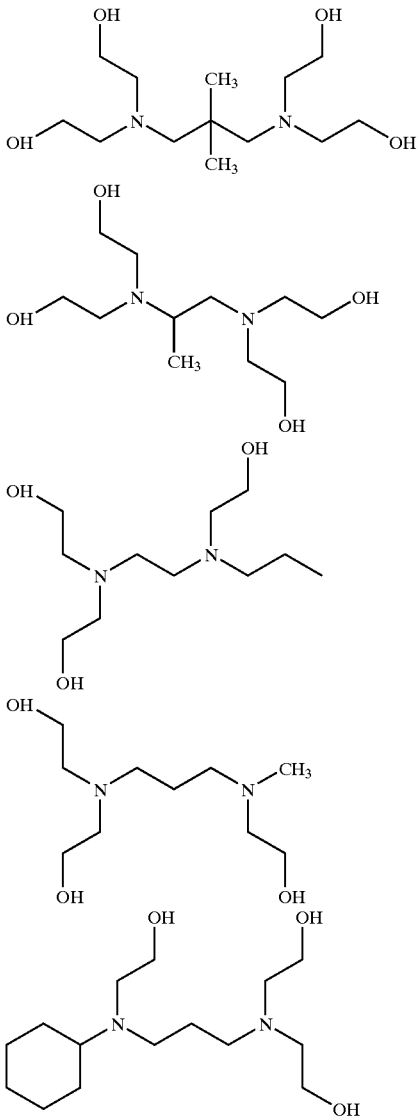

Compounds of the formula VIa are also the compounds of the formula

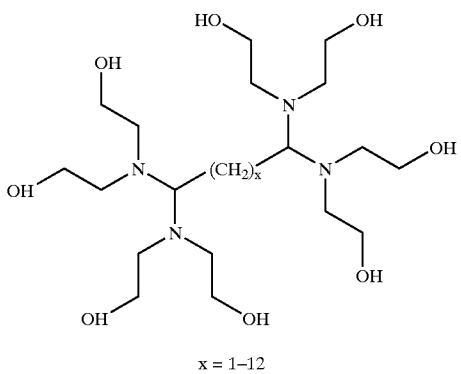

x = 1–12

(2) Compounds of the Formula VIb

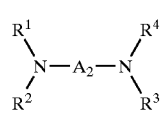

(VIb)

where

A₂ is $C_2$–CB alkylene interrupted by at least one $NR^5$ group, $R^5$ (or the radicals $R^5$ independently of one another) being $C_2$–$C_4$ hydroxyalkyl or $C_1$–$C_4$ alkyl, and $R^1$, $R^2$, $R^3$ and $R^4$ independently of one another are $C_2$–$C_4$ hydroxyalkyl or H.

The radical A₂ is preferably interrupted by one or two groups $NR^5$. Particularly useful compounds of this type are the compounds of the following formulae:

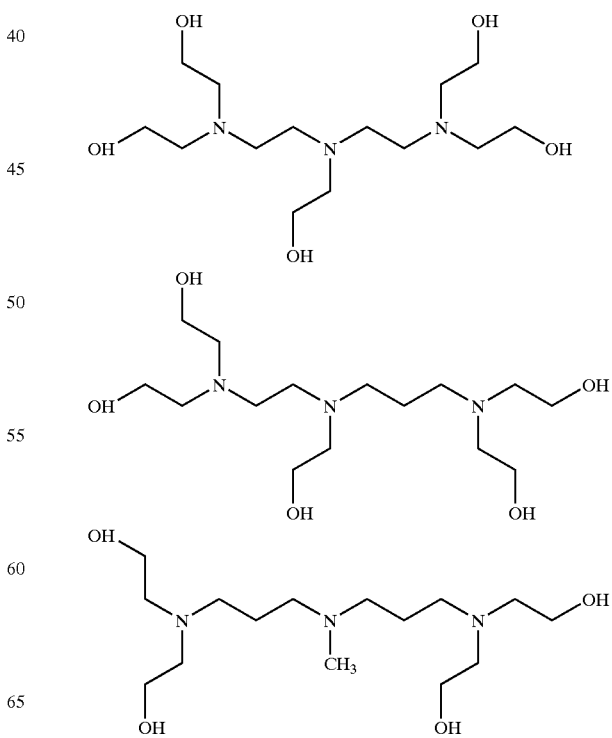

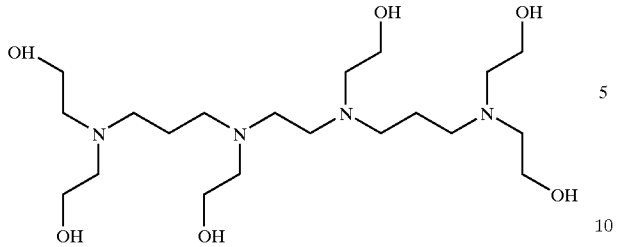

(3) Compounds of the Formula VIc

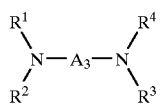
(VIc)

where
- $A_3$ is $C_2$–$C_8$ alkylene interrupted by at least one $NR^5$ group, $R^5$ being H, $C_2$–$C_4$ hydroxyalkyl or $CH_2CH_2NR^6R^7$,
- $R^1$, $R^2$, $R^3$ and $R^4$ independently of one another are $C_1$–$C_4$ alkyl uninterrupted or interrupted by at least one $NR^5$ group and/or unsubstituted or substituted by at least one $NR^6R^7$ group,
- $R^5$ is H, $C_2$–$C_4$ hydroxyalkyl or —$R^8NR^6R^7$, and
- $R^6$ and $R^7$ independently of one another are H, $C_2$–$C_4$ hydroxyalkyl or —$R^8NR^6R^7$,
- $R^8$ is an ethylene or propylene radical, and (on average) at least 30%, in particular >60%, and preferably >80% of the (hydroxyalkylatable) nitrogen atoms carry a hydroxyalkyl group.

The $C_2$–$C_8$ alkylene group is preferably interrupted by at least two groups in $NR^5$. Particularly useful compounds of this type are reaction products of ethylene oxide with polyethyleneimines of different molecular weights having two or more structural elements $NR^6R^7$ and $NR^5$. Polyethyleneimines which can be used are those whose weight-average molecular weight lies in the range from 400 to 2 000 000. The schematic formula below is intended to illustrate the compounds of this type:

where $R^5$ is H, $C_2$–$C_4$ hydroxyalkyl or —$R^8NR^6R^7$ and $R^6$ and $R^7$ are H, $C_2$–$C_4$ hydroxyalkyl or —$R^8NR^6R^7$, and $R^8$ is $(CH_2)_2$, where on average >40%, in particular >60%, and with particular preference >80% of the ethoxylatable NH functions of the polyethyleneimine have been reacted with ethylene oxide.

(4) Compounds of the Formula VIe

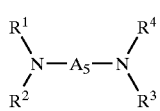
(VIe)

where

- $A_5$ is $C_6$–$C_{18}$ alkylene interrupted by at least one $NR^5$ group, $R^5$ being $(CH_2)_nNR^6R^7$ or $C_1$–$C_4$ alkyl which is uninterrupted or interrupted by at least one $NR^5$ group, $R^5$ being $(CH_2)_nR^6R^7$ or $C_1$–$C_4$ alkyl, and/or is unsubstituted or substituted by at least one $NR^6R^7$ group,
- n is 2 or 3, and
- $R^1$, $R^2$, $R^3$, $R^4$, $R^6$ and $R^7$ independently of one another are $C_2$–$C_4$ hydroxyalkyl or H.

Particularly useful compounds of this type are polyamines of the formulae

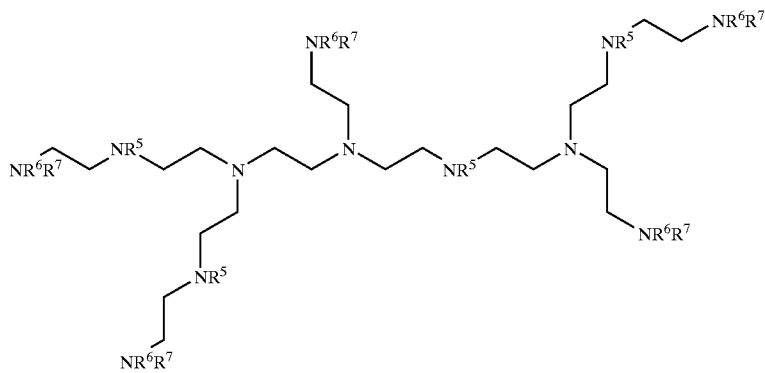

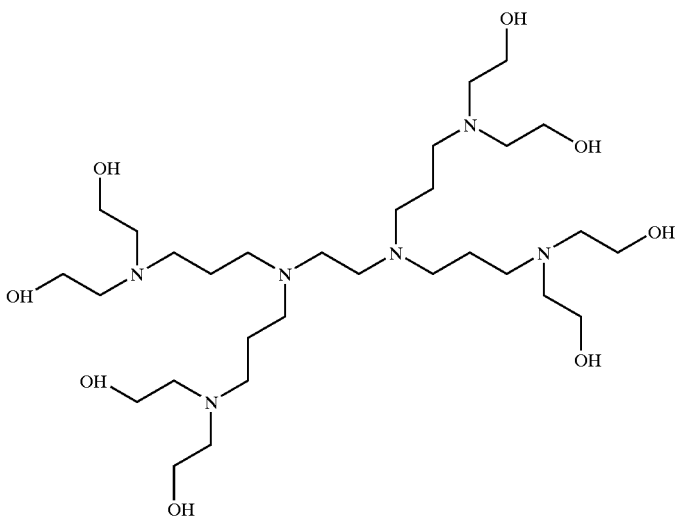
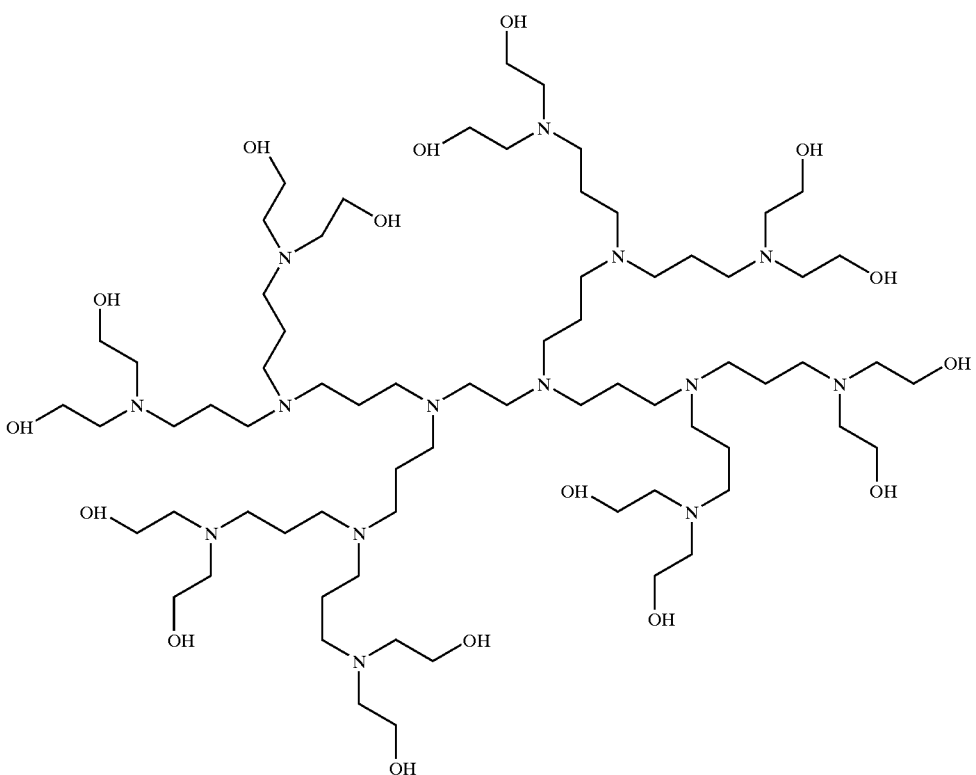
(5) Compounds of the Formula VIf
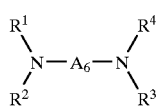
(VIf)
where
$A_6$ is $C_2$–$C_{12}$ alkylene interrupted by at least one oxygen atom, and
$R^1$, $R^2$, $R^3$ and $R^4$ independently of one another are $C_2$–$C_4$ hydroxyalkyl or H.
The alkylene chain is preferably interrupted by 1, 2 or 3 oxygen atoms. Particularly useful compounds of this type are the compounds of the following formulae:

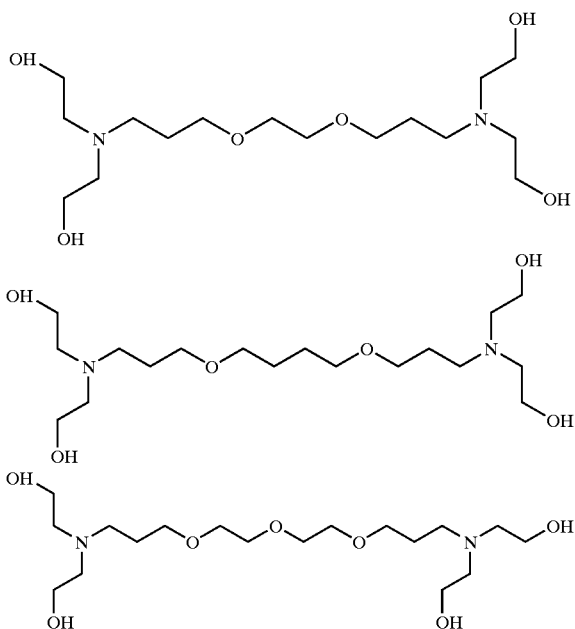

(6) Compounds of the Formula VIg

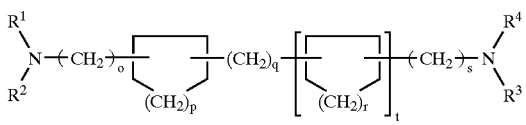
(VIg)

where
- o, q and s independently of one another are 0 or an integer in the range from 1 to 6;
- p and r independently of one another are 1 or 2 and t is 0, 1 or 2,
- it also being possible for the cycloaliphatic rings to be substituted by 1, 2 or 3 $C_1$–$C_4$ alkyl radicals, and $R^1$, $R^2$, $R^3$ and $R^4$ independently of one another are $C_2$–$C_4$ hydroxyalkyl or H.

Particularly useful compounds of this type are

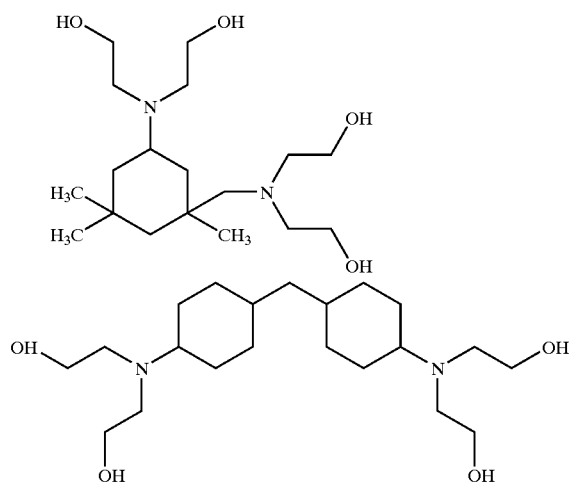

(7) polyalkanolamines obtainable by condensing di- or trialkanolamines with themselves or with one another, where appropriate in the presence of monohydric or polyhydric alcohols or monofunctional or polyfunctional amines.

One example of oligomeric or polymeric compounds of this kind is the condensation product prepared from triethanol, shown in idealized form by the following schematic formula:

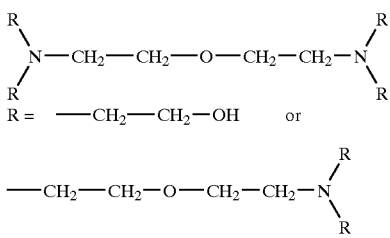

The compounds of the formula VI and their preparation are known, for example, from DE-A 19621573 and the literature cited therein.

Preferred amines containing at least two hydroxyl groups in this embodiment of the invention are amines of the formula IV or VI containing at least two 2-hydroxyethyl groups. The compounds of the formulae IV and VI preferably have molecular weights below 1 000 g/mol. Particular preference among them is given to diethanolamine, triethanolamine, and ethoxylated diethylenetriamine, in which on average every NH hydrogen atom of the diethylenetriamine has been replaced by a 2-hydroxyethylene group.

Of course, the binders of the invention may contain both a hydroxyl-containing amine with a long-chain hydrocarbon radical and an amine different therefrom and containing at least two hydroxyl groups.

In addition, the binder powders of the invention can include β-hydroxyalkylamides as well, preferably the β-hydroxyalkylamides specified in U.S. Pat. No. 5,143,582, of the formula

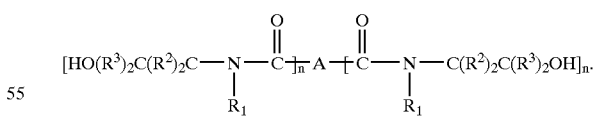

Particularly preferred β-hydroxyalkylamides of the above formula are those in which $R^1$ is hydrogen, a short-chain alkyl group, or $HO(R^3)_2C(R^2)_2C$—, n and n' are each 1, —A— is a —$(CH_2)_m$— group, m is from 0 to 8, preferably from 2 to 8, $R^2$ at each occurrence is hydrogen, and in each case one of the $R^3$ groups is hydrogen and the other is hydrogen or $C_1$–$C_5$ alkyl. Bis[N,N-di(2-hydroxyethyl)] adipamide is particularly preferred.

The addition of amines having at least two hydroxyl groups and of β-hydroxyalkylamides generally brings about better curing of the compositions of the invention at a given curing temperature, or, respectively, curing at low temperature for a given curing time. The weight fraction of the crosslinkers relative to the sum of polymer A1 and A2 is from 0 to 30% by weight, preferably from 0.1 to 15% by weight.

In addition, a reaction accelerant may be added to the binders of the invention. Preferred such accelerants are phosphorus compounds, especially hypophosphorous acid and its alkali metal salts and alkaline earth metal salts, or alkali metal tetrafluoroborates. Further reaction accelerants which may be added include salts of Mn(II), Ca(II), Zn(II), Al(III), Sb(III) or Ti(IV), or strong acids, such as para-toluenesulfonic acid, trichloroacetic acid and chlorosulfonic acid. The weight fraction of the reaction accelerant relative to the sum of polymer A1 and A2 is from 0 to 5% by weight, preferably from 0.1 to 2% by weight. However, reaction accelerants are not absolutely necessary and are not used in preferred embodiments of the invention.

Particularly preferred binders are those comprising
  from 70 to 50% by weight of polymer A1,
  from 30 to 50% by weight of polymer A2 and, if desired
  from 0 to 20% by weight of at least one hydroxy-containing amine,
  from 0 to 5% by weight of reaction accelerants.

In general, the binder powders of the invention are prepared by removing the aqueous constituents from an aqueous dispersion of the polymer A1 containing the amine containing at least one hydroxyl group and the polymer A2 by conventional techniques of powder preparation. The water is then preferably removed by the method of spray drying. Where the method of spray drying is operated, it is also possible to dry an aqueous solution of the polymer A2 and an aqueous dispersion of the polymer A1 together, preferably by spray drying, it being possible for both the dispersion of the polymer A1 and the solution of the polymer A2 to comprise the amine containing at least one hydroxyl group.

In the process for preparing the binders of the invention it has proven appropriate to prepare the polymer A1 in the presence of the polymer A2 by the method of free-radical aqueous emulsion polymerization. One embodiment of the invention accordingly provides a process for preparing heat-curable polymeric binders which comprises:
  preparing a heat-curable aqueous composition by
    i) aqueous emulsion polymerization of the monomers forming the polymer A1 in the presence of at least one polymer A2 and, if desired, in the presence of the amine containing at least one hydroxyl group, and/or of further components,
    ii) addition, if desired, of at least one further component to the dispersion obtained in step i), said component being selected from the above-described amines containing at least one hydroxyl group, reaction accelerants, further customary additives, and mixtures thereof,
  coagulating the composition, if desired, and
  removing the water, preferably by evaporation to form a powder.

If desired, coagulation or dewatering may be followed by filtration, conducted in accordance with customary techniques.

It is also possible to prepare the binder powders of the invention by first preparing an aqueous dispersion of the polymer A1, preferably by the method of free-radical aqueous emulsion polymerization, to convert this polymer to a polymer powder by evaporating the water, and to combine this powder with the desired amount of an aqueous solution of the polymer A2 and of the amine containing at least one hydroxyl group, and to dry the resulting preparation again. In this case an example of the procedure is to introduce the polymer into a spray dryer or to supply it by way of a solids feed and to supply the polymer A2 and the amine containing at least one hydroxyl group to the dryer in the form of one aqueous solution or of two separate aqueous solutions. In this case the powder comprising polymer A1 is first of all wetted with the solutions of amine and polymer A2 and then a solid powder is formed having the composition according to the invention.

The polymer A1 is generally prepared by aqueous emulsion polymerization of the aforementioned ethylenically unsaturated monomers in the presence of at least one surface-active agent and of a free-radical polymerization initiator, a batchwise, semicontinuous or continuous procedure being possible. It is advantageous to meter the polymer A2 together with monomers of the polymer A1, in the form of an emulsion feed, into the reaction vessel. If desired, some or all of the constituent monomers of the polymer A1, and the polymer A2, may be supplied to the reaction vessel by way of two or more separate feed streams. The monomers may be supplied to the reaction vessel either in preemulsified form or in non-preemulsified form. In one preferred embodiment, at least some of the polymer A2 is supplied to the reaction vessel together with at least one monomer component of A1. Advantageously, aqueous polymer dispersions of the invention that are obtained generally have a lower viscosity than conventional dispersions.

The polymer A2 may also be included in whole or in part in the initial charge to the reactor. The use of a defined amount of a seed latex as initial charge to the polymerization reactor is advantageous for the purpose of targeted establishment of a particle size distribution in the polymer dispersions of the invention. It is possible to use from 0 to 25% by weight, preferably from 0.01 to 10% by weight, in particular from 0.1 to 5% by weight, of seed latex based on the polymer A1.

The polymer dispersion is generally prepared in water as the dispersing medium. However, it is also possible for water-miscible organic solvents to be present, such as alcohols and ketones, examples being methanol, ethanol, n-propanol, isopropanol, n-butanol, acetone or methyl ethyl ketone, in a proportion of up to approximately 30% by volume.

For preparing the aqueous dispersions of the polymers A1 it is possible to use the protective colloids and emulsifiers which are commonly used in an emulsion polymerization. Preferably, no protective colloids are used. In general, the emulsifiers will be used in an overall amount of from 0.1 to 20% by weight, based on the monomers forming the polymer A1.

The emulsifiers may be anionic or nonionic in nature. Examples of anionic emulsifiers are salts, preferably alkali metal salts and especially sodium salts, or ammonium salts, of alkylbenzenesulfonic acids, sulfonated fatty acids, alkyl esters of sulfosuccinic acid, of sulfuric monoesters of fatty alcohols, ethoxylated fatty alcohols with degree of ethyoxylation preferably in the range from 2 to 50, of alkylphenols and ethoxylated alkylphenols.

Examples of nonionic emulsifiers which can be used include ethoxylates of alkylphenols, fatty alcohols, oxo alcohols or fatty acids having degrees of ethoxylation in the range of preferably 2 to 50, and also EO/PO block copolymers or alkyl polyglycosides.

As surface-active substance instead of or together with the aforementioned emulsifiers it is also possible to use the above-described hydroxyl-bearing amine with a long-chain hydrocarbon radical and, in particular, the amine of the formula $R^cNR^aR^b$, especially if at least one of the radicals $R^a$ or $R^b$ is a radical of the formula II or III.

Preferably, no further emulsifiers are added to the aqueous dispersion thus prepared, comprising polymer A1 and A2.

The polymerization in step i) is preferably conducted in the presence of compounds which form free radicals (initiators). The amount required of these compounds is preferably from 0.05 to 10, with particular preference from 0.2 to 5% by weight, based on the monomers used in the polymerization.

Examples of suitable polymerization initiators are peroxides, hydroperoxides, peroxodisulfates, percarbonates, peroxo esters, hydrogen peroxide, and azo compounds. Examples of initiators, which can be soluble in water or else insoluble in water, are hydrogen peroxide, dibenzoyl peroxide, dicyclohexyl peroxodicarbonate, dilauroyl peroxide, methyl ethyl ketone peroxide, di-tert-butyl peroxide, acetylacetone peroxide, tert-butyl hydroperoxide, cumene hydroperoxide, tert-butyl perneodecanoate, tert-amyl perpivalate, tert-butyl perpivalate, tert-butyl perneohexanoate, tert-butyl per-2-ethylhexanoate, tert-butyl perbenzoate, lithium, sodium, potassium and ammonium peroxodisulfates, azodiisobutyronitrile, 2,2'-azobis(2-amidinopropane)dihydrochloride, 2-(carbamoylazo) isobutyronitrile, and 4,4'-azobis(4-cyanovaleric acid). The known redox initiator systems as well, such as $H_2O_2$/ascorbic acid or t-butyl hydroperoxide/sodium hydroxymethanesulfinate, for example, can be used as polymerization initiators.

The initiators can be employed alone or in a mixture with one another, examples being mixtures of hydrogen peroxide and sodium peroxodisulfate. For polymerization in an aqueous medium it is preferred to use water-soluble initiators.

In order to prepare polymers A1 having a low average molecular weight it is often judicious to conduct the copolymerization in the presence of regulators. Customary regulators can be used for this purpose, examples being organic compounds containing SH groups, such as 2-mercaptoethanol, 2-mercaptopropanol, mercaptoacetic acid, tert-butyl mercaptan, n-octyl mercaptan, n-dodecyl mercaptan and tert-dodecyl mercaptan, hydroxylammonium salts such as hydroxylammonium sulfate, formic acid, sodium bisulfite, or isopropanol. The polymerization regulators are generally used in amounts of from 0.05 to 5% by weight, based on the monomers.

The components which may be present additionally in the binder of the invention such as crosslinkers, reaction accelerants, etc., are added after the end of the emulsion polymerization in step ii).

The dispersions of the polymers A1 which may contain the polymer A2 are finely divided stable latices. The weight-average particle size of the latex particles is from about 10 to 1500 nm, preferably from 20 to 1000 nm, with particular preference from 30 bis 500 nm, measured with the aid of the analytical ultracentrifuge (AUC).

Before they are dried to give the powders of the invention, the aqueous binder dispersions have a nonvolatiles content (solids content) in the range from about 20 to 75% by weight, preferably from 25 to 65% by weight. The viscosity (at a solids content of 40% by weight) lies generally within a range from about 10 to 4000 mPas, measured using a rotational viscometer in accordance with DIN 53019 at 23° C. and a shear rate of 250 s$^{-1}$. In addition to the abovementioned constituents, the binders of the invention may include customary additives, depending on their intended application.

Furthermore, the binders may include, depending on their intended application, bactericides or fungicides. Furthermore, they may include hydrophobicizing agents in order to increase the water resistance of the treated substrates. Suitable hydrophobicizing agents are customary aqueous paraffin dispersions or silicones. In addition, the compositions may comprise wetting agents, thickeners, plasticizers, retention agents, pigments, and fillers.

Finally, the binders of the invention may comprise customary flame retardants, such as aluminum silicates, aluminum hydroxides, borates and/or phosphates, for example.

In many cases the binders also include coupling reagents, such as alkoxysilanes, an example being 3-aminopropyltriethoxysilane, soluble or emulsifiable oils as lubricants and dust binders, and also wetting auxiliaries.

The binders of the invention may also be used as blends with other binders, such as urea-formaldehyde resins, melamine-formaldehyde resins or phenol-formaldehyde resins, for example, and with epoxy resins.

The compositions of the invention, i.e., binders plus additives, are formaldehyde-free. Formaldehyde-free denotes that the compositions of the invention contain no substantial amounts of formaldehyde and also that no substantial amounts of formaldehyde are released in the course of drying and/or curing. In general, the compositions contain <100 ppm formaldehyde. They permit the production of moldings with a short curing time, and give the moldings excellent chemical properties.

Prior to their use, the heat-curable formaldehyde-free binders of the invention are essentially uncrosslinked and are therefore thermoplastic. If required, however, a low level of precrosslinking of the polymer A1 may be established, by using, for example, monomers having two or more polymerizable groups.

If desired, the heat-curable aqueous compositions obtained in accordance with the process of the invention may be agglomerated prior to drying. Suitable agglomeration techniques include pressure agglomeration, freeze agglomeration and chemical agglomeration. In the case of freeze agglomeration, the dispersions are frozen in layers, producing a partial colloidal instability which leads to a gathering-together of the latex particles, and then are thawed again. In the case of chemical agglomeration, an agglomerant is added to the finely divided polymer dispersions in order to initiate a controlled agglomeration process. Examples of suitable agglomerants are crosslinked polyurethanes and polyalkylene oxides.

One technique for increasing the average particle size by pressure agglomeration is, for example, flow through a restrictor.

The powderous binder of the invention is then recovered by drying the composition, e.g., by spray, freeze or fluidized-bed drying. A further process for preparing the powder from the dispersion is coagulation with subsequent drying or filtration.

Spray drying, which is preferred, is conducted in customary spray drying installations, with atomization taking place by means of single-, dual- or multi-substance nozzles or with a rotating disk. The exit temperature chosen is generally within a range from about 55 to 100° C., preferably from 65 to 90° C.

For spray drying, the dispersion of the polymer, with a solids content of preferably from 20% to 70%, and together if desired with protective colloids and/or free-flow aids as spraying assistants, is sprayed and dried. Protective colloids which may be used in this case are the hydrophilic oligomers and polymers customary for the spray drying of aqueous polymer dispersions, the protective colloids being addable to the aqueous dispersion prior to spray drying, in the form of an aqueous solution. If desired, from 1 to 20% by weight, preferably from 5 to 20% by weight, of protective colloid, based on the polymer, is added in this process step. Preferably, in the drying of the aqueous polymer dispersion comprising polymer A1 and A2, and any additives and other auxiliaries that may be present, no further protective colloids are added. Suitable free-flow aids include the inorganic oxides that are customary for this purpose, an example being finely divided silica. Free-flow aids are used generally in an amount of up to 5% by weight, e.g., from 0.1 to 5% by weight, based on the polymer.

The binder of the invention in powder form may generally be obtained without the use of spraying assistants, by drying of the aqueous dispersion.

Powderous binders have the advantage that they are easy to store and transport, require no drying effort in the shaped part, and lend themselves particularly well to mixing with and/or distribution in fibrous and particulate substrate materials.

Advantageously, the powderous binders of the invention are completely, or almost completely, redispersible in water.

The heat-curable polymer dispersion powder and its aqueous redispersion forms are suitable for producing shaped parts and in particular for consolidating fibrous or particulate substrate materials. Examples of suitable such materials include natural materials, such as wood chips, wood fibers, textile fibers, glass fibers, mineral fibers and natural fibers, such as jute, flax, hemp or sisal, cork chips, sand, cellulose fibers, wool, cotton, and also synthetic fibers, especially synthetic fibers based on filament-forming polymers.

When the binders of the invention or polymer dispersions obtained from them are used as binders for fibrous and particulate substrates, such as, for example, wood chips, wood fibers, textile fibers, glass fibers, mineral fibers or natural fibers such as jute, flax, hemp or sisal, and also cork chips or sand, curing thereof gives bound substrates having a high mechanical strength, which also retain their dimensional stability under humid conditions. Heat curing is preferred. The curing temperatures are generally from 80 to 250° C., preferably from 100 to 200° C.

By curing in this context is meant the chemical alteration of the composition; for example, crosslinking by formation of covalent bonds between the different constituents of the compositions, formation of ionic interactions and clusters, and formation of hydrogen bonds. Curing may also be accompanied by physical changes within the binder, such as phase rearrangements or phase inversions, for example. An advantage of the compositions of the invention is that they may be cured at comparatively low temperatures. The duration and temperature of heating influence the degree of cure.

Curing may also take place in two or more stages. For example, in a first step the curing temperature and time may be chosen such that the degree of curing attained is low, and substantially complete curing takes place in a second step. This second step may take place in spatial and temporal separation from the first step. By this means, for example, it becomes possible to use the compositions of the invention to produce semifinished goods which are impregnated with binder and then are shaped and cured at another location.

The invention further provides a bound substrate obtainable by treating a fibrous or particulate substrate material with a powderous binder of the invention or with an aqueous polymer dispersion thereof and then curing it. The substrate is preferably in the form of a molding. The moldings preferably have a density of from 0.2 to 1.4 g/cm$^3$ at 230° C.

To produce the moldings, the powderous binder is scattered onto, scattered into, or shaken into the substrate material, which may have been mechanically preconsolidated, or is mixed directly with the fiber material. If the binder is to be scattered on, scattered in or shaken in, the substrate material is preferably spread out in the form of a sheet and, if desired, is compacted. Before the scattering-on of the binder, the substrate may also be moistened with water. This brings about pre-binding of the substrate material, as a result of which the substrate becomes transportable in pre-bound, but not crosslinked, form. In the case of binder solutions or binder dispersions, such prebinding is not possible, since these dispersions are no longer reactivatable.

Particularly suitable moldings are sheets and shaped parts having a contour. Their thickness is generally at least 1 mm, preferably at least 2 mm, and their surface area is typically from 200 to 200,000 cm$^2$. Consideration may be given, in particular, to wood fiberboards and chipboards, cork boards, cork blocks and cork molds, insulant boards and insulant rolls made, for example, from mineral fibers and glass fibers, interior automotive parts, such as interior door trim, dashboards, and parcel shelves, etc.

The amount by weight of the polymer powder of the invention is generally from 0.5 to 40% by weight, preferably from 1 to 30% by weight, based on the substrate (fibers, slivers or chips).

The fibers, slivers or chips can be coated directly with the binder or mixed with the powderous binder. The viscosity of the aqueous binder is preferably adjusted to from 10 to 4000, with particular preference to from 30 to 2000 mPas (DIN 53019, rotational viscometer at 250 s$^{-1}$).

The mixture of fibers, slivers and chips and the binder can be subjected to initial drying at temperatures, for example, of from 10 to 150° C. and then to compression molding to form the moldings at temperatures, for example, of from 80 to 250° C., preferably from 100 to 200° C., under pressures of generally from 2 to 1000 bar, preferably from 10 to 750 bar, with particular preference from 200 to 500 bar.

The polymer powders of the invention are particularly suitable binders for producing woodbase materials such as wood chipboards and wood fiberboards (cf. Ullmanns Encyclopadie der technischen Chemie, 4$^{th}$ edition 1976, volume 12, pp. 709–727), which can be produced by gluing disintegrated wood, such as wood chips and wood fibers, for example. The water resistance of woodbase materials can be enhanced by processing the binder together with a customary commercial aqueous paraffin dispersion or other hydrophobicizing agents, or adding said hydrophobicizing agents beforehand or subsequently to the fibers, slivers or chips.

Chipboard production is widely known and is described, for example, in H. J. Deppe, K. Ernst Taschenbuch der Spanplattentechnik, 2$^{nd}$ edition, Verlag Leinfelden 1982.

It is preferred to use chips whose average size is from 0.1 to 4 mm, in particular from 0.2 to 2 mm, and which contain less than 6% by weight of water. However, it is also possible to use considerably coarser chips and those with a higher moisture content. The binder is applied with great uniformity to the wood chips, the weight ratio of binder to wood chips preferably being from 0.02:1 to 0.3:1.

The glued wood chips are then scattered out to form a layer with a highly uniform surface, the thickness of the layer being guided by the desired thickness of the finished chipboard. The scattered layer is pressed at a temperature of from 100 to 250° C., for example, preferably from 120 to 225° C., by applying pressures of usually from 10 to 750 bar, to form a board. The required press times may vary within a wide range and are generally from 15 seconds to 30 minutes.

The wood fibers of appropriate quality required to produce medium density fiberboard (MDF) panels from the binders can be produced from barkless wood chips by milling in special mills or refiners at temperatures of about 180° C.

For gluing, the wood fibers are generally swirled up in a stream of air and the binder is introduced through nozzles into the resultant fiber stream (blow-line process). The ratio of wood fiber to binder based on the dry-matter content or solids content is usually from 40:1 to 2:1, preferably from 20:1 to 4:1. The glued fibers are dried in the fiber stream at temperatures of, for example, from 130 to 180° C., scattered out to form a fiber web, and pressed under pressures of from 10 to 50 bar to form boards or moldings.

Alternatively, as described for example in DE-A-24 17 243, the glued wood fibers can also be processed to a transportable fiber mat. This intermediate can then be processed further to boards or shaped parts, such as door interior trim panels of motor vehicles, for example, in a second, temporally and spatially separate step.

Other natural fiber substances as well, such as sisal, jute, hemp, flax, coconut, banana and other fibers, can be processed with the binders to form boards and shaped parts. The natural fiber materials can also be used in mixtures with plastic fibers, such as polypropylene, polyethylene, polyester, polyamides or polyacrylonitrile. In this case the plastic fibers may also function as cobinders in addition to the binder of the invention. The proportion of plastic fibers in this case is preferably less than 50% by weight, in particular less than 30% by weight and, with very particular preference, less than 10% by weight, based on all chips, slivers or fibers. The fibers can be processed by the method used for the wood fiberboards.

The bound substrates obtained in accordance with the invention feature low water absorption, little increase in thickness (swelling) after storage in water, and good strength and are formaldehyde-free.

In addition, the polymer powders of the invention can be used as binders for coating materials and impregnating materials for boards made of organic and/or inorganic fibers, nonfibrous mineral fillers, and starch and/or aqueous polymer dispersions. The coating and impregnating materials impart a high flexural modulus to the boards. The production of such boards is known.

Boards of this kind are commonly used as soundproofing panels. The thickness of the panels is usually within the range from about 5 to 30 mm, preferably in the range from 10 to 25 mm. The edge length of the square or rectangular panels is usually in the range from 200 to 2000 mm.

In addition, the polymer powders of the invention may include the auxiliaries customary in coating and impregnating technology. Examples of such auxiliaries are finely divided inert fillers, such as aluminum silicates, quartz, precipitated or pyrogenic silica, light and heavy spar, talc, dolomite or calcium carbonate; color pigments, such as titanium white, zinc white, iron oxide black, etc., and adhesion promoters, and also preservatives.

The components of the polymer powder of the invention are generally present in the coating material in an amount of from 1 to 65% by weight. The proportion of the inert fillers is generally from 0 to 85% by weight. The proportion of water in the coating material is at least 10% by weight.

The coating materials are employed in a customary manner by application to a substrate, for example, by spraying, rolling, pouring or impregnating. The amounts applied, based on the dry-matter content of the composition, are generally from 2 to 100 g/m$^2$.

The amounts of additives to be used are known to the skilled worker and are guided in each individual case by the desired properties and the intended application.

The compositions of the invention can also be used as binders for insulating materials made from inorganic fibers, such as mineral fibers and glass fibers. Insulating materials of this kind are produced industrially by spinning melts of the corresponding mineral raw materials; see U.S. Pat. No. 2,550,465, U.S. Pat. No. 2,604,427, U.S. Pat. No. 2,830,648, EP-A-354 913 and EP-A-567 480. The composition is then worked into the freshly produced, still hot inorganic fibers. The composition remains, in essentially uncured form, adhering as a viscous mass to the fibers. A continuous, binder-containing fiber mat produced in this way is transported on by means of appropriate conveyor belts through a curing oven. In the oven, the mat cures at temperatures in the range from about 100 to 200° C. to form a rigid matrix. After curing, the mats of insulating material are processed appropriately.

The predominant fraction of the mineral fibers or glass fibers used in the insulating materials has a diameter in the range from 0.5 to 20 μm and a length in the range from 0.5 to 10 cm.

The compositions of the invention are further suitable as binders for fiber webs.

Examples of fiber webs that may be mentioned are webs of cellulose, cellulose acetate, esters and ethers of cellulose, cotton, hemp, animal fibers, such as wool or hair, and, in particular, webs of synthetic or inorganic fibers, examples being aramid, carbon, polyacrylonitrile, polyester, mineral, PVC, or glass fibers.

In the case of use as binders for fiber webs, the compositions of the invention may include, for example, the following additives: silicates, silicones, boron compounds, lubricants, wetting agents.

Preference is given to glass fiber webs. The unbound fiber webs (untreated fiber webs), especially of glass fibers, are bound, i.e., consolidated, by the binder of the invention.

For this purpose, the polymer powder of the invention is applied to the untreated fiber web preferably in a weight ratio of fiber to binder of from 10:1 to 1:1, with particular preference from 6:1 to 3:1, in the conventional manner, e.g., by blowing in with the fiber material.

Incorporation of the polymer powder into the untreated fiber web is generally followed by curing at, preferably, from 100 to 400° C., in particular from 130 to 280° C., with very particular preference from 130 to 230° C., over a period of preferably from 10 seconds to 10 minutes, in particular from 10 seconds to 3 minutes.

The bonded fiber web obtained has high strength in the dry and wet states. In particular, the binders of the invention permit short drying times and also low drying temperatures.

The bonded fiber webs, especially glass fiber webs, are suitable for use as or in roofing membranes, as base materials for wallpapers, or as inliners or base material for floor coverings made, for example, from PVC.

For use as roofing membranes, the bonded fiber webs are generally coated with bitumen.

The compositions of the invention are suitable, furthermore, as formaldehyde-free sand binders for producing casting molds and cores for metal casting according to conventional thermal hardening processes (E. Flemming, W.

Tilch, Formstoffe und Formverfahren, Dt. Verlag für Grundstoffindustrie, Stuttgart, 1993).

They are suitable also as binders for mold insulating boards.

The nonlimiting examples which follow are intended to illustrate the invention.

The nonvolatiles contents were determined from the weight loss of a 1 g sample. dried at 120° C. for 2 h in a circulating-air drying cabinet.

The viscosity of the compositions was determined in a Rheomat from Physica at a shear rate of 250 sec$^{-1}$ at 23° C. in accordance with DIN 53019.

The K value of the polymers A2 was determined by the method of Fikentscher (DIN 53276).

The pH was determined using a handylab 1 pH meter from Schott.

The dilutability was investigated by successively diluting a dispersion sample with deionized water with visible formation of agglomerate resulting in a negative assessment.

Preparation of Dispersions D1 to D6 Used for Drying

EXAMPLE 1a

Preparation of a Carboxyl-containing Polymer A2

A pressure reactor with anchor stirrer is charged with 0.66 kg of deionized water, 0.82 kg of maleic anhydride, and 0.45 kg of a 40% strength by weight aqueous solution of an ethoxylated oleylamine (average degree of ethoxylation=12, e.g., Lutensol®FA from BASF AG). This initial charge is heated to 125° C. under a nitrogen atmosphere. On reaching this temperature, feed stream 1, consisting of 0.90 kg of deionized water and 0.82 kg of acrylic acid, is metered in over the course of 4 h, and feed stream 2, consisting of 0.26 kg of deionized water and 0.14 kg of $H_2O_2$ (30% strength by weight), is metered in over the course of 5 h, both feeds being introduced at a uniform rate. After the end of feed stream 1, a further 0.13 kg of deionized water is added. After the end of the reaction, the mixture is cooled to room temperature. The resultant aqueous polymer solution has a solids content of 43.2%, a pH of 1.8, and a viscosity of 72 mPas. The K value is 9.0.

EXAMPLE 1b

Preparation of the Polymer A1, Dispersion D1

A 4 l glass vessel with anchor stirrer is charged with 896 g of water, 780 g of an aqueous solution of an acid polymer A2 (50.0% strength by weight) as described in Example 1a, 5% by weight of feed stream 1, containing 618 g of 2-ethylhexyl acrylate and 33 g of 2-hydroxyethyl acrylate, and 10% by weight of feed stream 2, containing 200 g of deionized water and 6.5 g of 2,2'-azobis(2-amidinopropane) dihydrochloride, and this initial charge is heated to 80° C. After 10 minutes, at this temperature, the remainder of feed stream 1 is metered in over the course of 3 h and the remainder of feed stream 2 over the course of 3.5 h. Subsequently, polymerization is continued at this temperature for minutes and the reaction mixture is cooled. The polymer dispersion prepared in this way contains 39.5% by weight nonvolatiles;and has a pH of 2.0. The viscosity of the resultant polymer dispersion is 16 mPas, the LT 74.

EXAMPLE 2

Dispersion D2

A 4 l glass vessel with anchor stirrer (220 rpm) is charged with 708 g of water, 1020 g of an aqueous solution of an acid polymer A2 (50.0% strength by weight) as described in Example 1a, 5% by weight of a feed stream 1, containing 595 g of styrene, 213 g of methyl methacrylate and 43 g of 2-hydroxyethyl acrylate, and 10% by weight of a feed stream 2, containing 150 g of deionized water and 8.5 g of sodium peroxodisulfate, and this initial charge is heated to 90° C. After 10 minutes, at this temperature, the remainder of feed stream 1 is metered in over the course of 3 h and the remainder of feed stream 2 over the course of 3.5 h. Subsequently, polymerization is continued at this temperature for 30 minutes and the reaction mixture is cooled. The polymer dispersion prepared in this way contains 49.3% by weight nonvolatiles and has a pH of 1.9. The viscosity of the resultant polymer dispersion is 66 mPas.

EXAMPLE 3

Dispersion D3

386 g of the polymer dispersion prepared in Example 2 are mixed with 46 g of an aqueous solution of 2,2',2''-nitrilotriethanol (50% strength by weight). The dispersion thus obtained has a pH of 3.2.

EXAMPLE 4a

Preparation of a Carboxyl-containing Polymer A2

A pressure reactor with anchor stirrer is charged with 0.60 kg of deionized water, 0.33 kg of maleic anhydride, and 0.88 kg of a 40% strength by weight aqueous solution of an ethoxylated oleylamine (average degree of ethoxylation=12, e.g., Lutensol®FA 12 from BASF AG). This initial charge is heated to 125° C. under a nitrogen atmosphere. On reaching this temperature, feed stream 1, consisting of 0.69 kg of deionized water and 0.74 kg of acrylic acid, is metered in over the course of 4 h, and feed stream 2, consisting of 0.14 kg of deionized water and 0.08 kg of $H_2O_2$ (30% strength by weight), is metered in over the course of 5 h, both feeds being introduced at a uniform rate. After the end of feed stream 1, a further 0.10 kg of deionized water is added. After the end of the reaction, the mixture is cooled to room temperature. The resultant aqueous polymer solution has a solids content of 37.8%, a pH of 1.8, and a viscosity of 305 mPas. The K value is 13.2.

EXAMPLE 4b

Preparation of a Polymer A1, Dispersion D4

A 4 l glass vessel with anchor stirrer (120 rpm) is charged with 994 g of water and 10% by weight of a feed stream 2, containing a solution of 8.0 g of sodium peroxodisulfate in 93 g of deionized water, and this initial charge is heated to 85° C. After 10 minutes, at this temperature, a feed stream 1, containing 560 g of styrene, 200 g of methyl methacrylate, 40 g of 2-hydroxyethyl acrylate and 1042 g of an acid polymer A2, as described in Example 4a, is metered in over the course of 3 h, and the remainder of feed stream 2 over the course of 3.5 h. Subsequently, polymerization is continued at this temperature for 30 minutes and the reaction mixture is cooled. The polymer dispersion prepared in this way contains 40.0% nonvolatiles and has a pH of 2.0. The viscosity of the resultant polymer dispersion is 56 mPas.

EXAMPLE 5

Dispersion D5

24 g of adipic acid bis(diethanolamide) are added to 475 g of the polymer dispersion prepared in Example 4b. The dispersion thus obtained has a pH of 2.1.

EXAMPLE 6a

Preparation of a Carboxyl-containing Polymer A2

A pressure reactor with anchor stirrer is charged with 0.55 kg of deionized water, 0.33 kg of maleic anhydride, and 0.66 kg of a 40% strength by weight aqueous solution of an ethoxylated oleylamine (average degree of ethoxylation=12, e.g., Lutensol®FA 12 from BASF AG). This initial charge is heated to 125° C. under a nitrogen atmosphere. On reaching this temperature, feed stream 1, consisting of 0.74 kg of deionized water and 0.92 kg of acrylic acid, is metered in over the course of 4 h, and feed stream 2, consisting of 0.14 kg of deionized water and 0.08 kg of $H_2O_2$ (30% strength by weight), is metered in over the course of 5 h, both feeds being introduced at a uniform rate. After the end of feed stream 1, a further 0.10 kg of deionized water is added. After the end of the reaction, the mixture is cooled to room temperature. The resultant aqueous polymer solution has a solids content of 42.2%, a pH of 1.4, and a viscosity of 500 mPas. The K value is 15.4.

EXAMPLE 6b

Preparation of a Polymer A1, Dispersion D6

A 4 ; glass vessel with anchor stirrer (120 rpm) is charged with 711 g of water and 10% by weight of a feed stream 2, containing a solution of 5.3 g of sodium peroxodisulfate in 93 g of deionized water, and this initial charge is heated to 85° C. After 10 minutes, at this temperature, a feed stream 1, containing 236 g of 2-ethylhexyl acrylate, 263 g of methyl methacrylate, 26 g of 2-hydroxyethyl acrylate and 1555 g of an acid polymer A2, as described in Example 6a, is metered in over the course of 3 h, and the remainder of feed stream 2 over the course of 3.5 h. Subsequently, polymerization is continued at this temperature for 30 minutes and the reaction mixture is cooled. The polymer dispersion prepared in this way contains 40.9% by weight nonvolatiles and has a pH of 2.0. The viscosity of the resultant polymer dispersion is 197 mPas.

Preparation of the Polymer Powders of the Invention P1 to P6

The polymer dispersions D1 to D6 described in the examples were processed to the powders P1 to P6 by spray drying using a Minor Hi-Tec spray-drying unit from GEA Niro A/S with an average solids content of approximately 30% by weight at an entry temperature of 150° C. and an exit temperature of 80° C. (dual-substance nozzle) without adding spraying assistants. The powders had good free-flow properties and were readily redispersible in water (yield 52–92%). The average bulk density of the dispersion powders was 0.3 g/cm³.

Preparation of the Polymer Powders of the Invention P7 and P8

P7: Preparation of a binder powder from a blend of polymer dispersion and a thermally reactive polymer solution.

3 kg of a 35% strength by weight aqueous solution of an acrylic acid/methacrylic acid copolymer (AA/MA=70:30) having a K value (according to Fikentscher, determined as a 2% by weight solution in water) of 12 and triethanolamine in a weight ratio of 10:3 are introduced as the initial charge.

With stirring, 1 kg of a mixture of 990 g of a 35% aqueous polymer dispersion (88 pbw styrene 10 pbw acrylonitrile 2 pbw acrylic acid, prepared by emulsion polymerization with 0.5% of polystyrene seed of particle size 30 nm, stabilized with 1 pbw of sodium lauryl sulfate, regulated with 0.5 pbw of ethylhexyl thioglycolate, initiated with 0.5 pbw of sodium persulfate; the particle size of the polymer dispersion is 200 nm as measured by ultracentrifuge ($d_{50}$ of the numerical distribution) and 10 g of an ethoxylated $C_{13}$ oxo alcohol having an average degree of ethoxylation of 8) is added.

The mixture is dried in a spray dryer with disk atomization.

Yield: 86%.

Particle size: 30 µm as the $d_{50}$ value of the volume distribution, measured using a Malvern Master Sizer.

P8: Preparation of a binder powder by spraying a thermally reative polymer solution onto a polymer dispersion powder prepared by spray drying.

From a 40% aqueous polymer dispersion (88 pbw styrene 10 pbw acrylonitrile 2 pbw acrylic acid, prepared by emulsion polymerization with 0.5% of styrene seed of particle size 30 nm, stabilized with 1 pbw of sodium lauryl sulfate, regulated with 0.5 pbw of ethylhexyl thioglycolate, initiated with 0.5 pbw of sodium persulfate; the particle size of the polymer dispersion is 200 nm as measured by ultracentrifuge ($d_{50}$ of the numerical distribution), a powder is prepared by spray drying.

Yield: 94%.

Particle size: 19 µm as the $d_{50}$ value of the volume distribution measured using a Malvern Master Sizer.

750 g of the dispersion powder thus prepared are introduced into a thermosettable solids mixer (manufactured by BASF AG) at 75° C. and are sprayed with 500 g of a 50% strength aqueous solution of the acrylic acid-methacrylic acid copolymer described in P7 and triethanolamine in a weight ratio of 10:3, spraying taking place at 45 rpm using a two-fluid nozzle and over a period of 160 minutes. Mixing is then continued at 70° C. for 1 hour with a nitrogen stream of 350 l/h.

Yield; (after sieving through a 100 µm sieve) 95 g of powder residual moisture content: 2%) and 53 g of residue.

Particle size: 23 µm of the $d_{50}$ value of the volume distribution, measuring using a Malvern Master Sizer.

Performance Results

A) Testing as Binders for Finely Divided Mineral Materials 600 g of quartz sand H34 were mixed in a Kenwood laboratory mixer first of all with 30 g each of dispersion powders P2, P4, P5, and P6. 30 g of water were then added to this mixture, with continued stirring. The moist mixtures were shaped in a metal mold into test specimens (Fischer bars) measuring 17×2.3×2.3 cm, which were compacted and then, after demolding, cured at 125° C. in a convection oven for 2 h. Compaction is carried out using a ram of type PRA from Georg Fischer AG.

The bending strength of the Fischer bars thus produced at 23° C. was determined in the dry state and in the wet state, following one-hour storage in demineralized water at 23° C., with a strength testing apparatus type PFG with the test device PBV (from Georg Fischer, Schaffhausen/CH). The results are set out in Table 1.

TABLE 1

| Binder | Bending strength at 23° C. | |
|---|---|---|
| | dry [N/cm$^2$] | wet [N/cm$^2$] |
| P2 | 530 | 130 |
| P4 | 540 | 180 |
| P5 | 940 | 660 |
| P6 | 1210 | 260 |

B) Testing as Binders for Cork Granules

In a Kenwood laboratory mixer, 75 g of dried cork granules (cleaned and ground cork, bulk density 60 g/l, average particle size 1.5 mm), 18.8 g of the powderous binder P1 and 11.2 g of water were mixed for 2 minutes. The binder-treated cork particles were introduced without further drying into a two-part metal mold with internal dimensions of 12.5×12.5 cm, and precompacted. The bottom and die of the mold were perforated with vent holes to take off the water vapor that is released. The metal mold was held in a press, preheated to 120° C., at a pressure of 100 bar for 2 h.

The result was a cork block having a thickness of 3.3 cm and a density of 0.17 g/cm$^3$. The thickness swelling of 5×5×3.3 cm sample specimens of this block after storage in demineralized water at 23° C. for 24 h was 1.2%. After boiling for 3 hours in demineralized water, the thickness swelling was 9%.

C) Test as Binders for Wood Fibers 70 g of wood fibers (thermomechanically digested spruce wood, average fiber length approximately 3 mm, residual moisture 7%) were mixed thoroughly with 13.2 g of dispersion powder. While mixing continued, 14 g of water were subsequently sprayed onto this fiber/binder mixture. The glued fibers were dried at 70° C. to a residual moisture content of 10% oven-dry and spread out to form a fiber mat measuring 19×19 cm.

These fiber mats were pressed in a hydraulic press (manufacturer: Wickert Maschinenbau GmbH, Landau, model WKP 600/3.5/3) at a temperature of 220° C. for 120 seconds between 2 metal plates with 2 mm spacers. First of all, a compressive pressure of 50 bar was established for 20 seconds. Then the pressure was released for seconds, after which a pressure of 200 bar was maintained for 90 seconds.

The resulting fiberboards were stored under standard climatic conditions at 23° C. and 65% relative atmospheric humidity for 24 h and then tested. The water absorption was determined by way of the weight increase (in %, based on the original weight). The thickness swelling of the wood fiberboards was determined as the relative increase in thickness of 2×2 cm sample specimens on storage in demineralized water for 24 h in analogy to DIN 52351. The data are compiled in Table 2.

TABLE 2

| Binder | Water absorption [%] | Thickness swelling [%] |
|---|---|---|
| P2 | 54 | 31 |
| P3 | 57 | 41 |
| P4 | 52 | 28 |
| P5 | 53 | 30 |
| P6 | 81 | 54 |

The heat stability of the wood fiberboards was measured on 5×15 cm sample specimens which had been fixed to a horizontal substrate with an overhang of 10 cm. A 100 g weight was suspended from the overhanging end of the sample specimens. The bending (bowing) relative to the horizontal that remains after storage at 120° C. for 1 hour following removal of the weight was measured. In the case of the wood fiberboard with the binder P5, bowing of 7 mm is found.

Testing of the Binders P7 and P8

153 g of wood fibers (thermomechanically digested spruce wood fibers, average fiber length approximately 2 mm, residual moisture approximately 11%) are mixed thoroughly with 27 g of binder powder. The fiber/binder mixture is spread out to form a fiber mat measuring 30×30 cm.

The fiber mat is pressed in a hydraulic press (WKP 600 from Wickert) at a press temperature of 220° C. between two metal plates with 2 mm thick spacers. First of all, a compressive pressure of 50 is applied for 60 seconds; after releasing the pressure for 10 seconds, a compressive pressure of 200 bar is applied for a further 90 seconds.

The resulting fiberboards are stored under standard climatic conditions at 23° C. and 65% relative atmospheric humidity for 24 hours. Then the thickness swelling after 24-hour storage in water at 23° C., and the flexural strength to DIN EN 310 at 23° C., are measured:

| Binder | Density [g/cm$^3$] | Thickness swelling [%] | Flexural strength [N/mm$^2$] |
|---|---|---|---|
| P7 | 0.86 | 36 | 43 |
| P8 | 0.85 | 28 | 49 |

We claim:

1. A heat-curable polymeric binder in powder form, comprising from 87.5 to 12.5% by weight, based on the total weight of the polymeric binder, of at least one water-insoluble polymer A1, from 12.5 to 87.5% by weight, based on the total weight of the polymeric binder, of at least one water-soluble polymer A2, and from 0.1 to 30% by weight, based on the total weight of the polymeric binder, of at least one amine containing a hydroxyl group, wherein the water-soluble polymer A2 comprises from 50 to 100% by weight, based on the weight of the polymer A2, of polyerized units of at least one ethylenically unsaturated monocarboxylic acid, dicarboxylic acid, or a mixture of monocarboxylic and dicarboxylic acid, from 0 to 50% by weight, based on the weight of the polymer A2, of at least one ethylenically unsaturated compound E selected from the group consisting of an ester of an ethylenically unsaturated monocarboxylic acid, a monoester of an ethylenically unsaturated dicarboxylic acid and a diester of an ethylenically unsaturated dicarboxylic acid, and up to 20% by weight, based on the weight of the polymer A2, of one or more further monomers, and wherein said amine is present in at least one compound E, as a separate component, or both as a separate component and in at least one compound E.

2. The binder as claimed in claim 1, wherein said amine containing at least one hydroxyl group is an amine of the formula I $$R^cNR^aR^b \qquad (I)$$

where $R^c$ is $C_6$ to $C_{22}$ alkyl, $C_6$ to $C_{22}$ alkenyl, aryl-$C_6$–$C_{22}$ alkyl or aryl-$C_6$–$C_{22}$ alkenyl, wherein the alkenyl radical may have 1, 2 or 3 nonadjacent double bonds, $R^a$ is hydroxy-$C_1$–$C_6$ alkyl or a radical of the formula II —(CH$_2$CH$_2$O)$_x$(CH$_2$CH(CH$_3$)O)$_y$—H (II)

where in the formula II the sequence of the alkylene oxide units is arbitrary and x and y independently of one another are integers from 0 to 100, and the sum of x and y is >1, $R^b$ is hydrogen, $C_1$ to $C_{22}$ alkyl, hydroxy-$C_1$–$C_6$ alkyl, $C_6$ to $C_{22}$ alkenyl, aryl-$C_6$–$C_{22}$ alkyl, aryl-$C_6$–$C_{22}$ alkenyl or $C_5$ to $C_8$ cycloalkyl, wherein the alkenyl radical may have 1, 2 or 3 nonadjacent double bonds, or $R^b$ is a radical of the formula III —(CH$_2$CH$_2$O)$_v$(CH$_2$CH(CH$_3$)O)$_w$—H (III)

where in the formula III the sequence of the alkylene oxide units is arbitrary and v and w independently of one another are integers from 0 to 100, and mixtures thereof.

3. The binder as claimed in claim 1, wherein the polymer A2 comprises polymerized units of at least one carboxylic acid selected from the group consisting of acrylic acid, methacrylic acid, crotonic acid, fumaric acid, maleic acid, 2-methylmaleic acid, itaconic acid and mixtures thereof.

4. The binder as claimed in claim 1, wherein the polymer A2 comprises in copolymerized form from 1 to 30% by weight of the ethylenically unsaturated compound E.

5. The binder as claimed in claim 1, wherein the weight ratio based on the weight of polymer A1 to the weight of polymer A2 is from 7:1 to 1:7.

6. The binder as claimed in claim 1, wherein the amine containing a hydroxyl group is of the formula IV

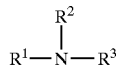
(IV)

where $R^1$ is a hydrogen atom, a $C_1$–$C_5$ alkyl group, a $C_2$–$C_{10}$ hydroxyalkyl group, or a radical of the formula V —(CH$_2$CH$_2$O)$_x$(CH$_2$CH(CH$_3$)O)$_y$—H (V)

where in the formula V the sequence of the CH$_2$CH$_2$O— and CH$_2$CH(CH$_3$)O— units is arbitrary and x and y independently of one another are integers from 0 to 100, the sum x+y is >1, and $R^2$ and $R^3$ independently of one another are a $C_2$–$C_{10}$ hydroxyalkyl group, or a compound containing at least two amino groups of formula (a), formula (b) or both (a) and (b), per molecule

(a)

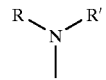
(b)

where R is $C_2$–$C_4$ hydroxyalkyl and R' is $C_1$–$C_5$ alkyl.

7. The binder as claimed in claim 6, wherein the compound of the formula IV is triethanolamine.

8. The binder as claimed in claim 6, wherein the weight ratio of polymer A1 to polymer A2 is from 7:1 to 1:1.

9. The binder as claimed in claim 1, further comprising from 0.01 to 2% by weight, based on the overall weight of the binder, of at least one reaction accelerant.

10. The binder as claimed in claim 9, wherein said reaction accelerant is a phosphorous compound.

11. The binder as claimed in claim 1, wherein the polymer A1 comprises polymerized units of
from 80 to 100% by weight, based on the overall weight of the monomers for the polymer A1, of at least one ethylenically unsaturated principal monomer and
up to 20% by weight, based on the total weight of the monomers for the polymer A1, of at least one ethylenically unsaturated comonomer.

12. A process for preparing the thermally curable polymeric binder as claimed in claim 1, which comprises
evaporating the water from an aqueous composition comprising
from 87.5 to 12.5% by weight of at least one water-soluble polymer A1,
from 12.5 to 87.5% by weight of at least one water-soluble polymer A2, and
from 0.1 to 30% by weight of at least one amine containing a hydroxyl group, to form a powder, wherein % by weight is based on the total weight of the aqueous composition.

13. The process as claimed in claim 12, further comprising:
preparing a heat-curable aqueous composition by aqueous emulsion polymerization of the monomers of the polymer A1 in the presence of at least one polymer A2 and, in the presence of the amine containing at least one hydroxyl group, further components, or both.

14. A process for preparing the binder as claimed in claim 1, which comprises:
treating a powder of polymer A1 with an aqueous solution of the polymer A2 and
removing the water by evaporation.

15. The process as claimed in claim 12, wherein the water is evaporated by spray drying or freeze drying.

16. A process for producing a bound substrate, comprising
coating or mixing a substrate material with a binder, or with the redispersed form of a binder claimed in claim 1, then
curing the binder.

17. The process as claimed in claim 16, wherein the substrate material is fibrous or particulate.

18. The bound substrate obtained by the process as claimed in claim 16.

19. The binder of claim 3, wherein the polymer A2 comprises (meth)acrylic acid, maleic acid or a mixture thereof.

20. The binder of claim 10, wherein the phosphorous compound is hypophosphorous acid, an alkali metal salt of hypophosphorous acid, an alkaline earth metal salt of hypophosphorous acid or a mixture thereof.

21. The process of claim 13, further comprising adding at least one further component to a dispersion obtained by aqueous emulsion polymerization, said component selected from the group consisting of a crosslinker, a reaction accelerant, a further customary additive and a mixture thereof.

22. The process of claim 13, further comprising coagulating the composition.

23. The process of claim 14, wherein the polymer A2 further comprises an amine containing at least one hydroxyl group.

24. The process of claim 17, wherein the substrate material is selected from the group consisting of wood chips, wood fibers, textile fibers, glass fibers, mineral fibers, natural fibers and mixtures thereof.

25. The process of claim 17, wherein the substrate material is selected from the group consisting of jute, flax, hemp, sisal, wood chips and sand.

26. A method of preparing a molding, said method comprising
    mixing the heat curable polymeric binder of claim 1 with a composition and
    preparing said molding.

27. The method of claim 26, wherein the composition comprises a fibrous or particulate material.

28. The method of claim 27, wherein the fibrous or particulate material is selected from the group consisting of wood chips, wood fibers, textile fibers, glass fibers, mineral fibers, natural fibers and mixtures thereof.

29. The method of claim 26, wherein the fibrous or particular materials are selected from the group consisting of jute, flax, hemp, sisal, cork chips and sand.

30. The process as claimed in claim 14, wherein the water is evaporated by spray drying or freeze drying.

* * * * *